D. T. IGOU.
MACHINE FOR MAKING STICK CANDY.
APPLICATION FILED SEPT. 21, 1916.
1,315,963.
Patented Sept. 16, 1919.
10 SHEETS—SHEET 1.
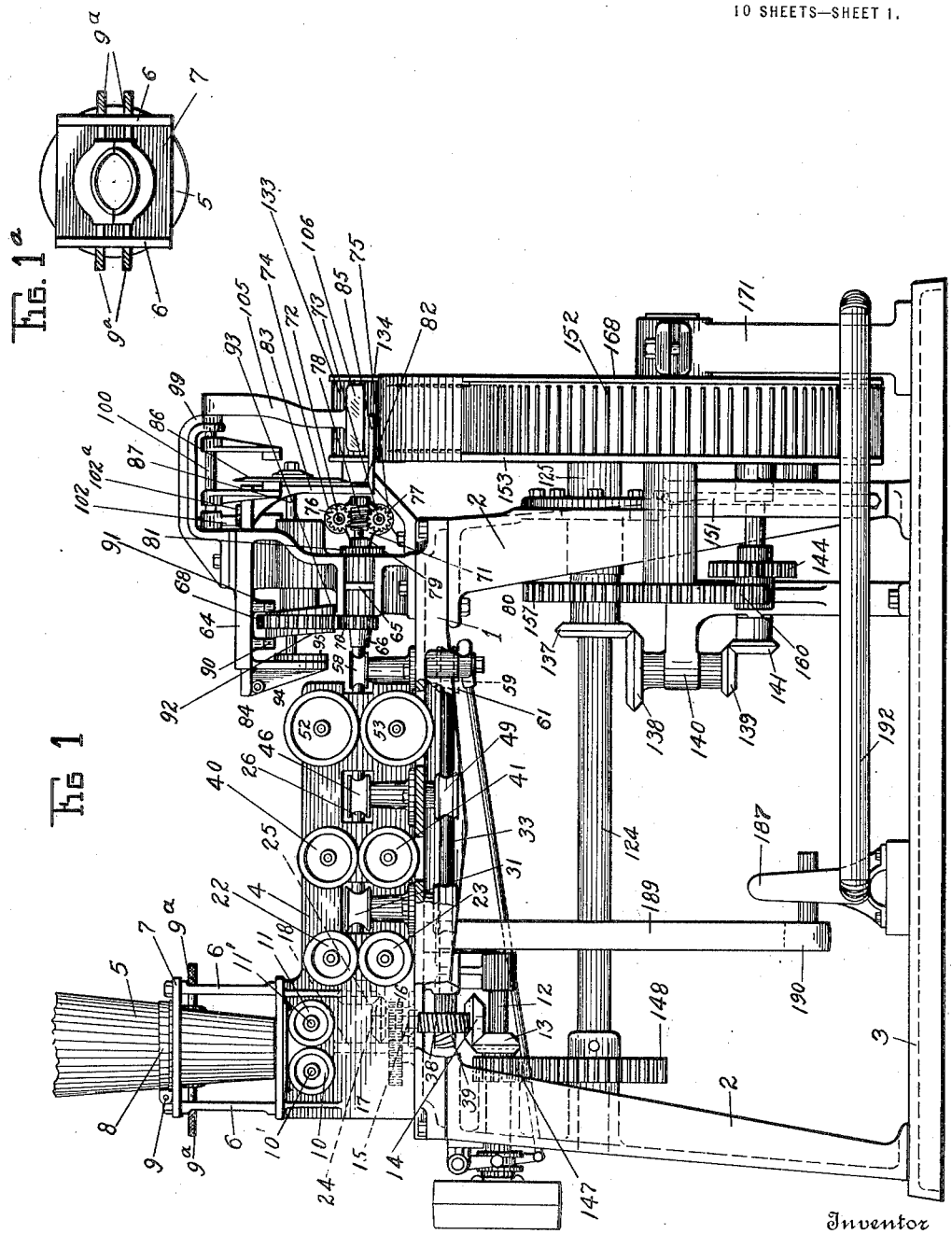

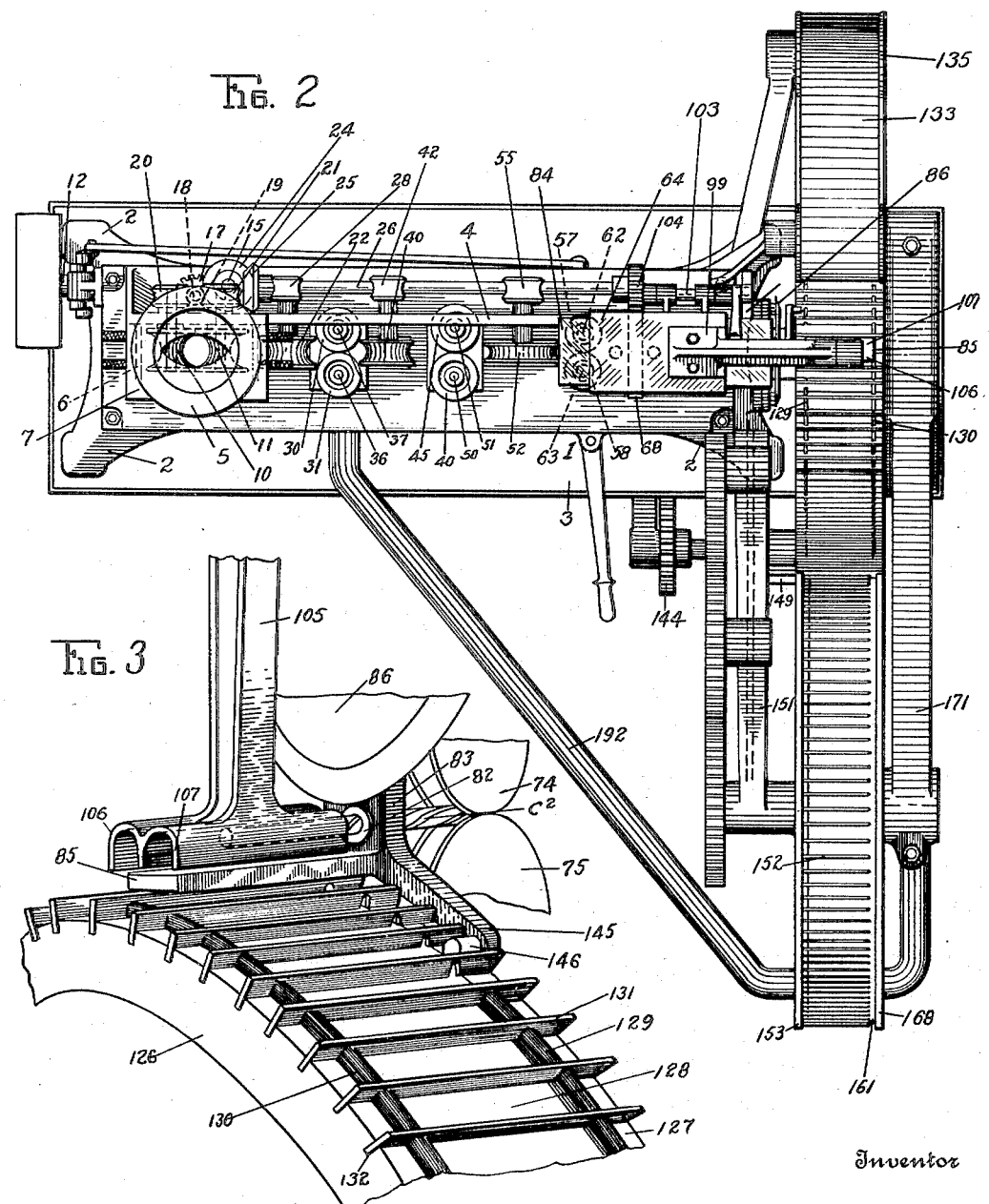

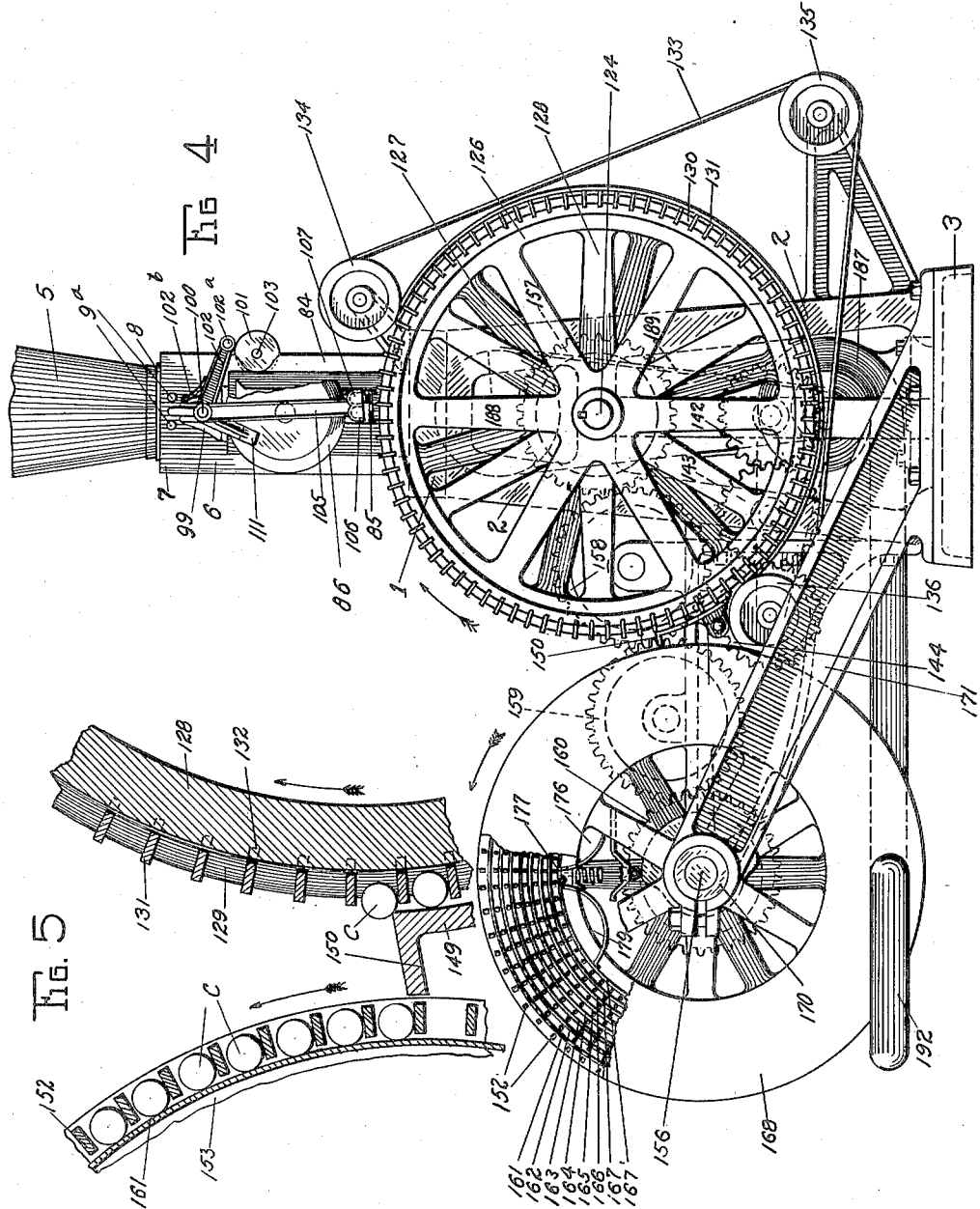

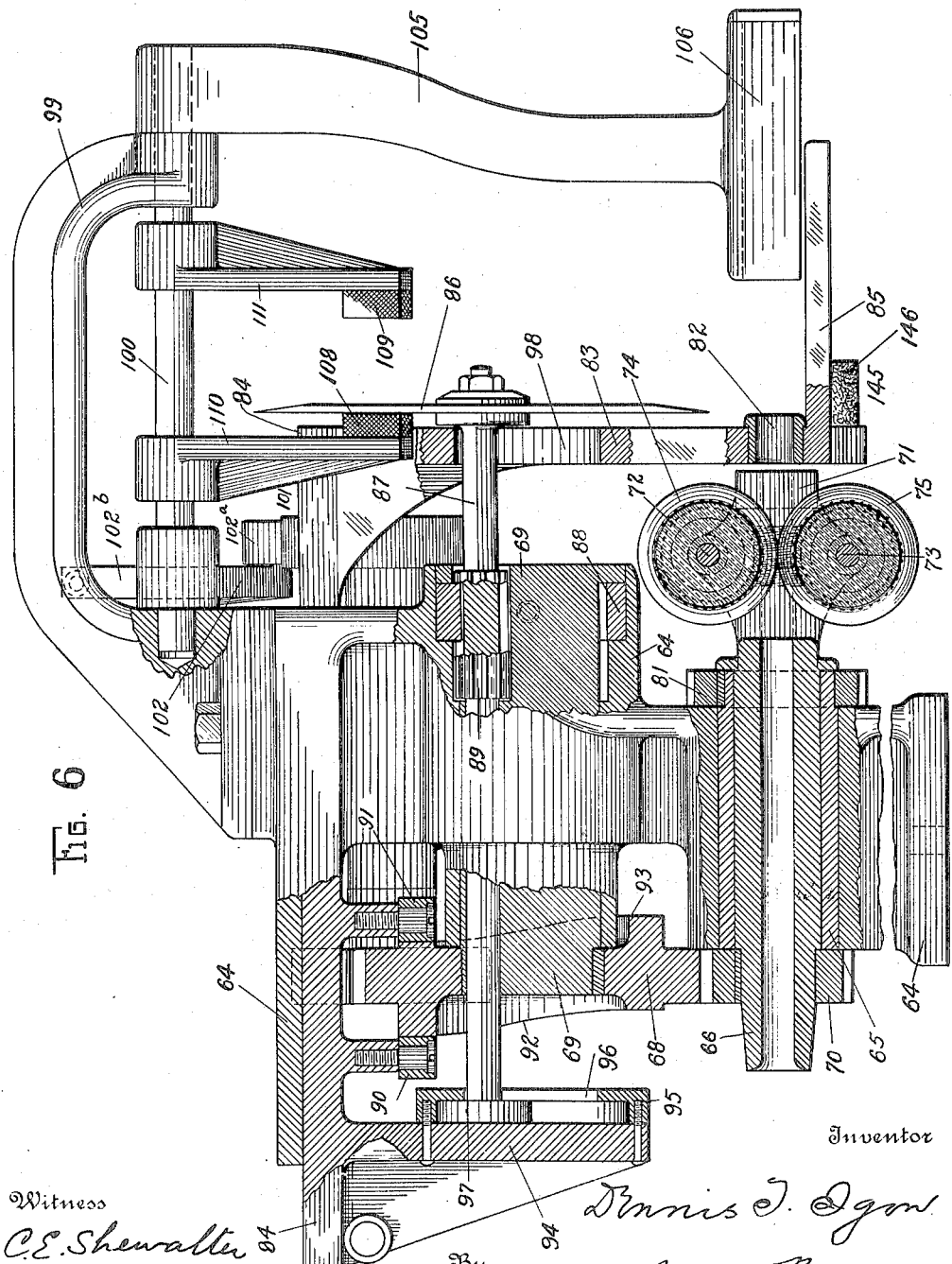

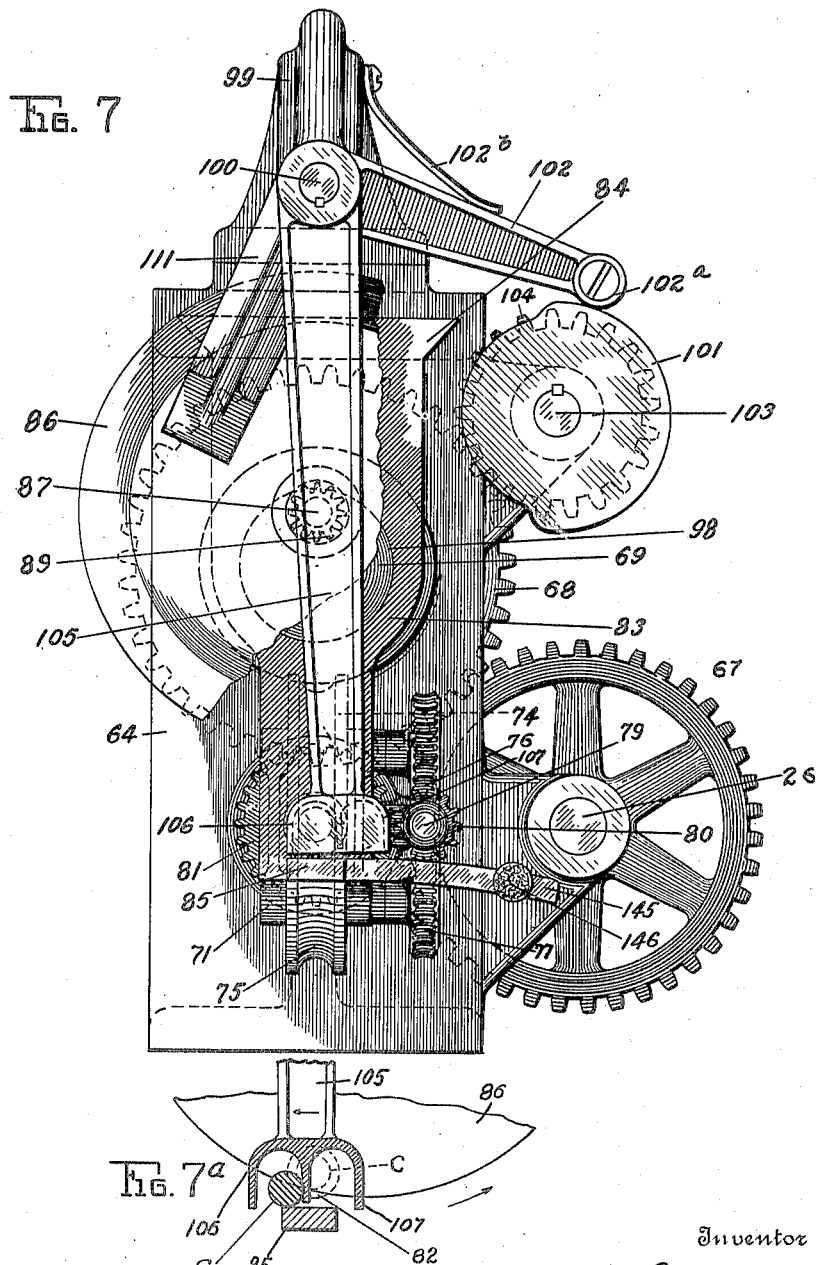

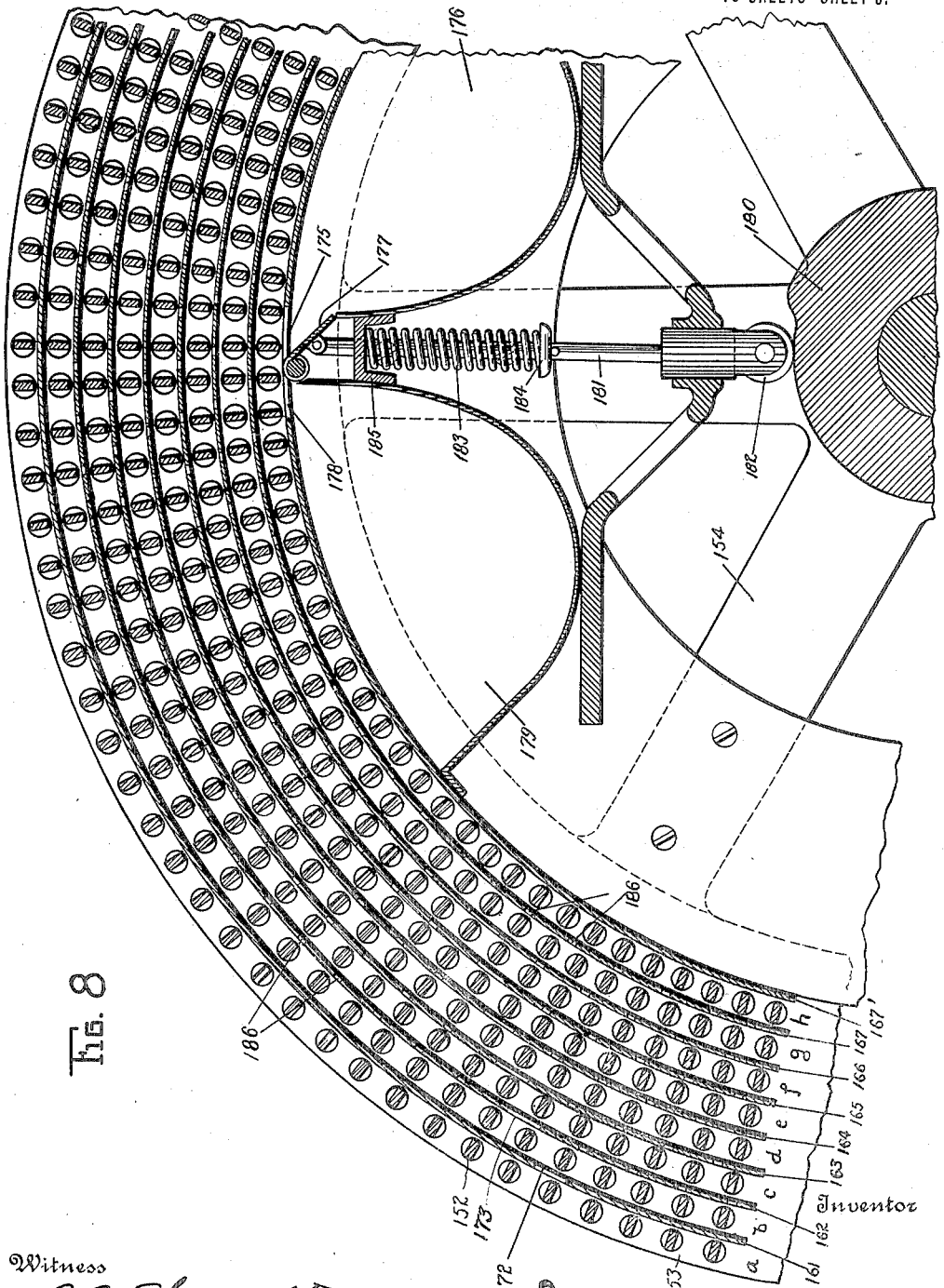

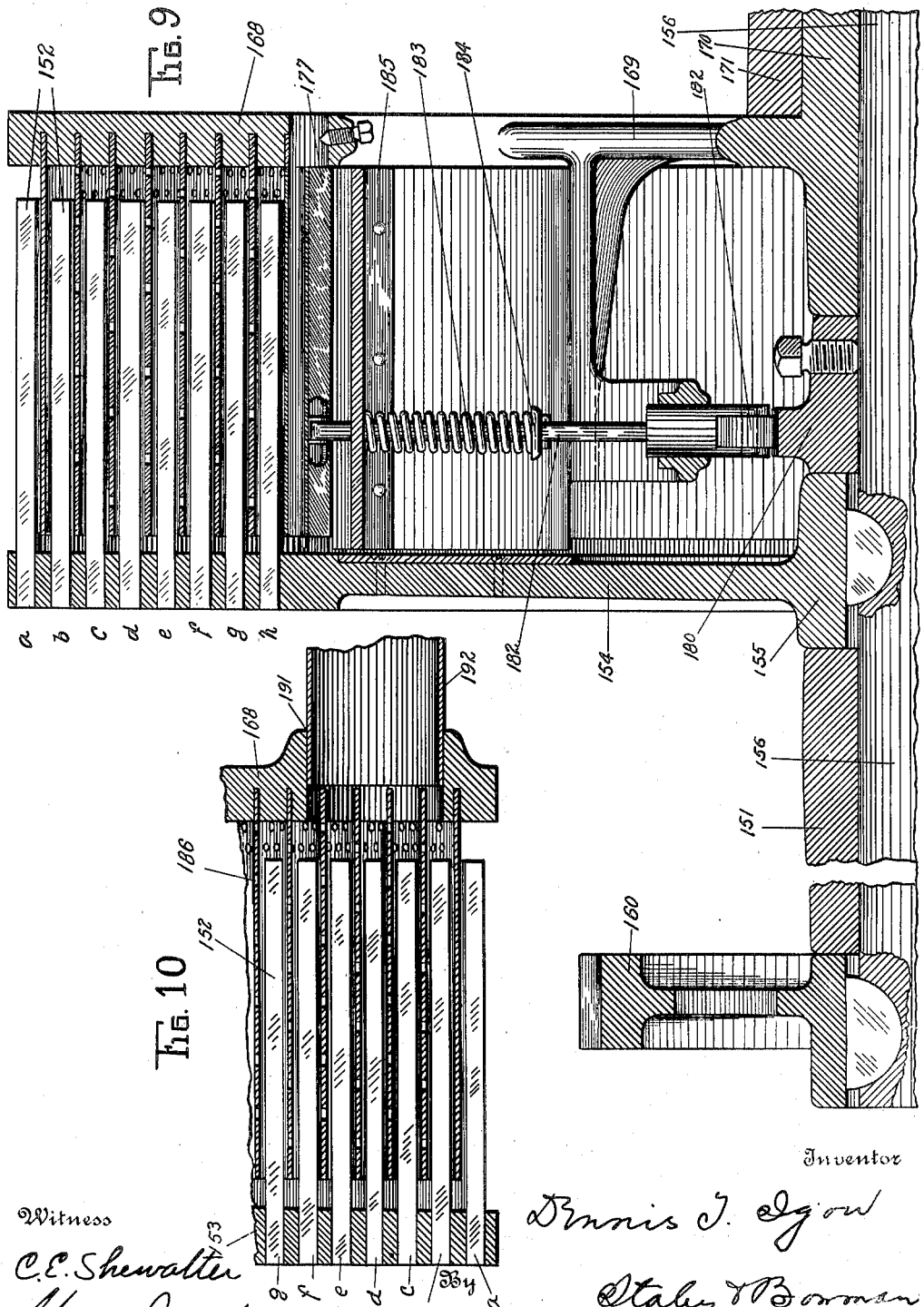

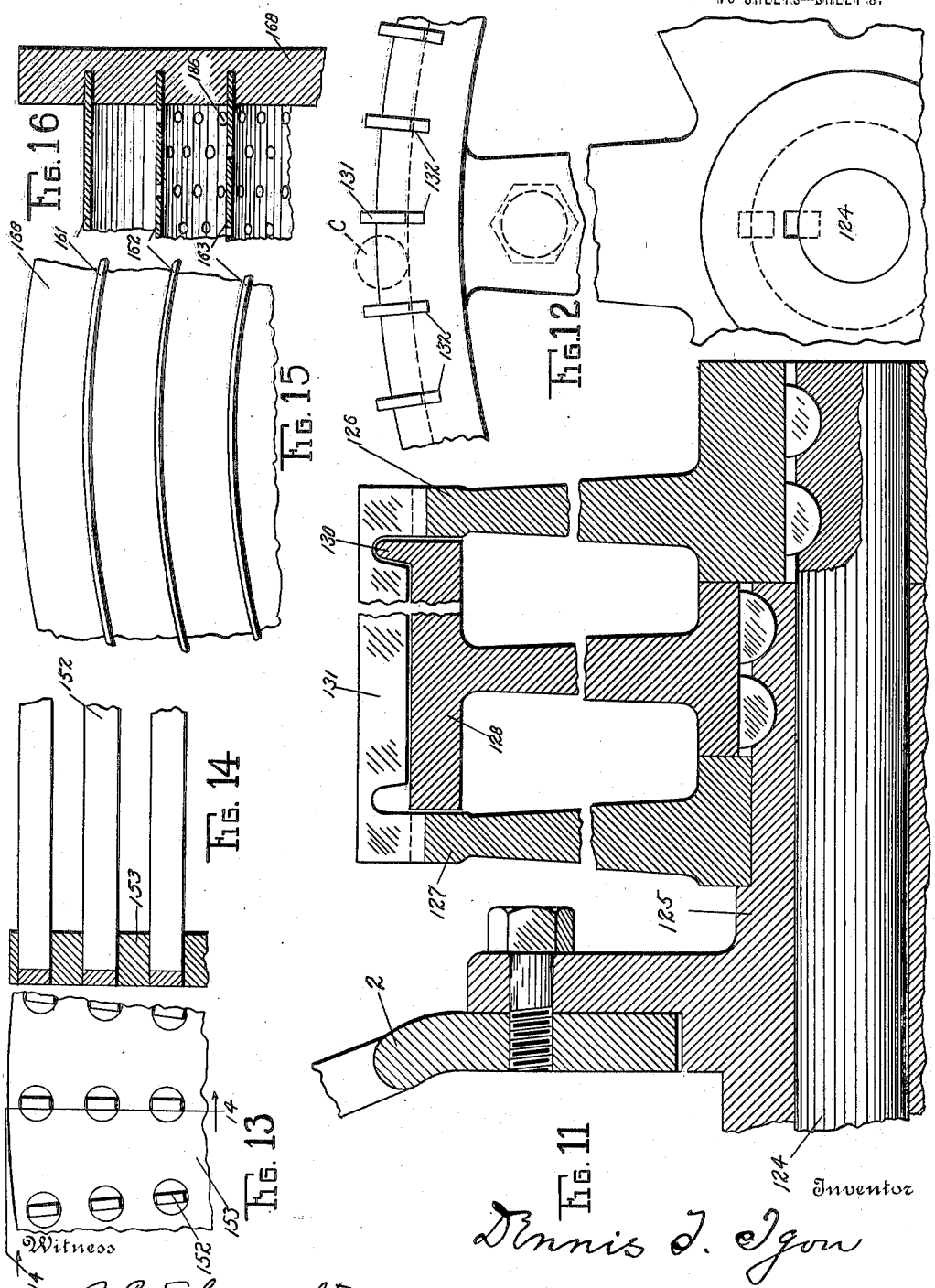

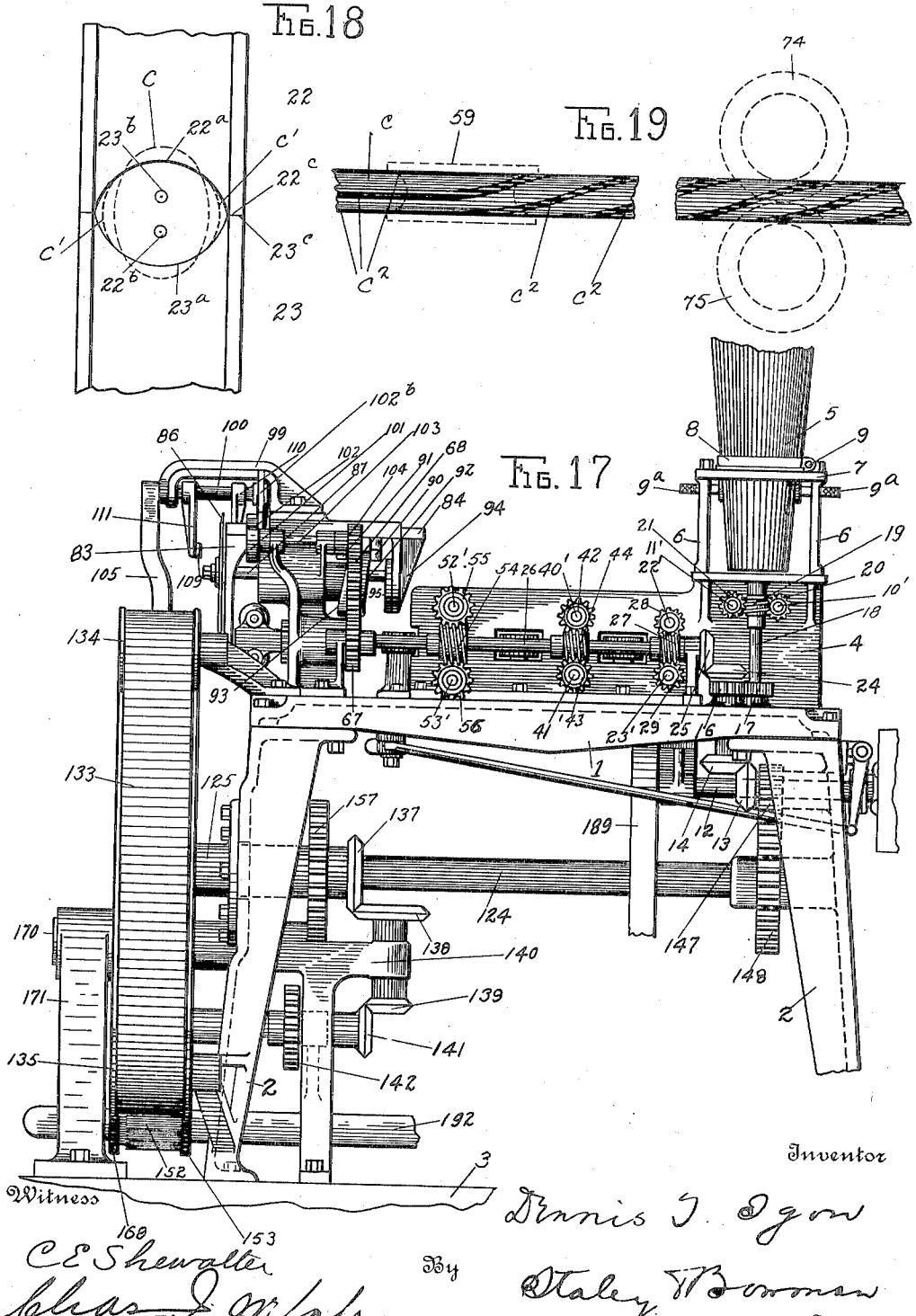

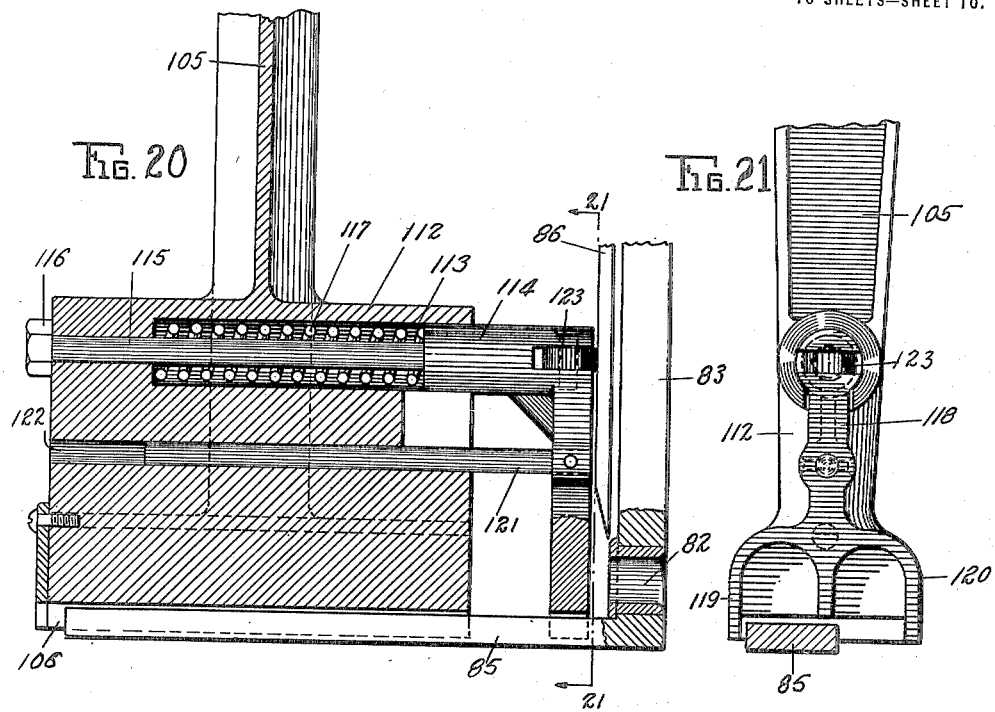
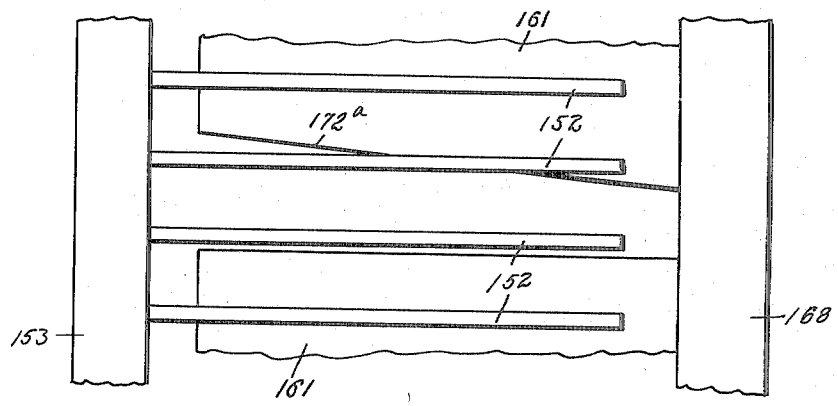

UNITED STATES PATENT OFFICE.

DENNIS T. IGOU, OF SPRINGFIELD, OHIO, ASSIGNOR TO THE IGOU MANUFACTURING COMPANY, OF SPRINGFIELD, OHIO, A CORPORATION OF OHIO.

MACHINE FOR MAKING STICK-CANDY.

1,315,963.  Specification of Letters Patent.  Patented Sept. 16, 1919.

Application filed September 21, 1916. Serial No. 121,383.

*To all whom it may concern:*

Be it known that I, DENNIS T. IGOU, a citizen of the United States, residing at Springfield, in the county of Clark and State of Ohio, have invented certain new and useful Improvements in Machines for Making Stick-Candy, of which the following is a specification.

This invention relates to improvements in machines for making candy, it being particularly adapted for the manufacture of what is known as stick candy, although some of the improvements are also applicable to machines for the manufacture of candy in other forms.

One of the objects of the invention is to devise a machine which will form the stick in a uniform manner.

A further object of the invention is to provide means for forming the sticks with rounded ends so as to eliminate any sharp and rough projections on the ends of the sticks which would have a tendency to punch through the wrappers which are applied thereto.

A further object of the invention is to improve the form of the reducing rollers so as to eliminate the danger of cracking the outer surface of the candy which is passing through the rolls.

A further object of the invention is to improve the mechanism for severing the candy in proper lengths and also the manner of discharging the severed sticks from the severing mechanism.

A further object of the invention is to provide improved devices for cooling the candy sticks after they have been discharged from the forming mechanism and to also provide effective means for discharging the sticks from the cooling devices so that they can be conveniently handled for wrapping or packing.

A further object of the invention is to provide a machine of the character referred to which will be simple in construction and effective and rapid in operation.

In the accompanying drawings:—

Figure 1 is a side elevation of a machine embodying my improvements.

Fig. 1ª is a bottom view of the hopper.

Fig. 2 is a top plan view of the same.

Fig. 3 is a perspective view of part of the severing and forming devices.

Fig. 4 is an end view.

Fig. 5 is an enlarged detail in section showing the manner of transferring the sticks from the final former to the cooler.

Fig. 6 is a longitudinal section of the severing and twisting mechanism, showing also the devices for discharging the severed sticks onto the final former.

Fig. 7 is a front elevation of the same.

Fig. 7ª is a detail of the severing and discharging devices.

Fig. 8 is a detail in transverse section of part of the cooler and also of the discharging devices therefrom.

Fig. 9 is a vertical section of the same.

Fig. 10 is a detail in section of a portion of the cooler showing the air circulation.

Fig. 11 is a vertical section of a portion of the final former.

Fig. 12 is a side elevation of the same.

Fig. 13 is a detail of the cooler.

Fig. 14 is also a detail in section of the cooler, the section being on the line 14—14 of Fig. 13.

Fig. 15 is another detail of the cooler.

Fig. 16 is a further detail of the cooler.

Fig. 17 is a rear view.

Fig. 18 is a detail of one set of reducing rolls.

Fig. 19 is a diagrammatic view illustrating the result of the twisting operation.

Fig. 20 is a longitudinal section through the disk charging devices, showing an attachment therefor and also showing the severing disk.

Fig. 21 is a section on the line 21—21 of Fig. 20.

Fig. 22 is a detail of the cooler.

Referring to the drawings, 1 represents a main support, which is secured at the upper ends of legs 2, the lower ends of which are secured to a bed plate 3. Secured to the upper side of the main support 1 is a longitudinally extending bracket 4 which carries a hopper 5 for the batch of candy and also a portion of the feeding and reducing devices. The hopper 5 is of a type which has been heretofore used in candy making machines, it being unnecessary to describe it in detail any more than to say that it is pivotally supported in a frame formed of standards or plates 6, the upper ends of which are connected by a plate 7 formed with a central opening through which the hopper 5 extends; the hopper being provided with a ring 8 which rests on the plate 7, which ring is pivoted as at 9 to said plate 7; pins 9ª secured to the hopper side and having a bearing in the standards 6, furnishing a further means of support for the hopper.

*Feeding and initial reducing devices.*

Located directly beneath the lower end of the hopper 5 is a pair of feeding rolls 10 and 11 which are rotated in opposite directions from the drive shaft 12, through the medium of the beveled gear 13 thereon, beveled gear 14 on the vertical shaft 15, gear 16 on said shaft 15, gear 17 on another vertical shaft 18, worm 19 on the upper end of the shaft 18, and worm wheels 20 and 21 connected to the shafts 10' and 11' of the respective rolls 10 and 11, (as shown best in Fig. 17).

From the feeding rolls 10 and 11, the strip of candy is fed between a set of reducing rolls 22 and 23 which are rotated also in opposite directions and at greater speed than the preceding feeding rolls through the medium of a beveled gear 24 on the upper end of the shaft 15, beveled gear 25 on the end of a longitudinal shaft 26, worm 27 on shaft 26, and worm wheels 28 and 29 connected to the shafts 22' and 23' of the respective rolls 22 and 23.

The strip of candy next passes between a second set of reducing rolls 30 and 31 which are driven through the medium of a worm (not shown) on the shaft 33, worm wheels, one 34 of which only is shown, and shafts 36 and 37 to which said worm wheels are connected and which also have connected therewith at the upper ends thereof the said reducing rolls 30 and 31 (shown in Fig. 1). The shaft 33 receives its motion from the spiral gear 38 and spiral gear 39 on the shaft 15. The ratio of gearing is such that these reducing rolls 30 and 31 are revolved at a greater speed than the preceding reducing rolls.

The candy next passes through a third set of reducing rolls 40 and 41 which are also revolved in opposite directions and at greater speed than the preceding set of rolls through the medium of worm wheels 42 and 43 on the shafts 40' and 41' of the rolls and worm 44 on the shaft 26.

The candy strip then passes through a fourth set of reducing rolls 45 and 46 which are revolved in opposite directions and at a greater speed than the preceding rolls through the medium of a worm (not shown) on the shaft 33 and worm wheels, one 49 of which only is shown on the lower end of vertical shafts 50 and 51 which carry at their upper ends the rolls 45 and 46. (See Fig. 1).

The candy strip then passes through a fifth set of reducing rolls 52 and 53 which are driven also in opposite directions and at greater speed than the preceding set of rolls through the medium of a worm 54 on the shaft 26 meshing with worm wheels 55 and 56 connected with the shafts 52' and 53' of the respective rolls 52 and 53. (See Fig. 17).

From these last mentioned rolls the candy strip passes through a set of feeding rolls 57 and 58 which are revolved in opposite directions and at greater speed than the preceding reducing rolls through the medium of a worm 59 on the shaft 33 which drives worm wheels one of which 61 only is shown on the lower end of vertical shafts 62 and 63 which carry at their upper ends the rolls 57 and 58.

The bottom of the hopper 5 is provided with a discharge opening of oblong or oval form as shown in Fig. 1ᵃ so that as the soft candy batch flows therethrough it will assume an oval form, the oval strip of candy passing through the feed rolls 10 and 11 which have their peripheries grooved to form an opening therethrough of substantially the same shape and size as the candy strip so that as the candy strip leaves these feeding rolls it will still be of an oval form and will approach the reducing rolls 22 and 23 in that form.

The reducing rolls of each set are also provided with grooved peripheries of peculiar formation. Heretofore it has been common to form the groove of each roll on the arc of a circle whose center is coincident with the extreme outer periphery of the roll, or in other words with the extreme outer periphery of the side edges or flanges of the roll. Inasmuch as the side edges or flanges of the rolls of each set are in close contact with each other this results in providing an opening between the same formed on a true circle which sometimes causes the strip of candy to be squeezed between the side edges or flanges of the rolls, and thus form fins along the strip. One way to obviate this difficulty was to employ side plates or guards to prevent the candy material from squeezing between the flanges, but that led to another difficulty as these guards would sometimes cause the material to bank up especially with high cooked material, and thus become clogged.

In order to overcome these difficulties the groove of each reducing roll in the present machine is formed on the arc of a circle whose center is at a point farther removed from the axis of the roll than the extreme outer edge of the side flanges thereof, as shown in Fig. 18. In this figure there is shown a set of reducing rolls such as the ones 22 and 23. In forming the grooves 22ᵃ and 23ᵃ in these rolls, the grooves are formed on the arcs of circles whose centers will be at the points represented by the dots in the small circles 22ᵇ and 23ᵇ respectively. It will be noticed that the point 22ᵇ, which represents the center from which the circle of the groove 22ᵃ is struck, is at a point farther removed from the center of the axis of the roll 22 than the extreme outer edge or flange 22$^c$ of said roll and the same thing is true of the center 23$^b$ with respect to the side edges or flanges 23$^c$ of the roll 23. This results in forming an oblong opening between the respective rolls 22 and 23.

Now, as the oval strip of candy approaches these reducing rolls 22 and 23, the arrangement is such that the longest diameter of the candy strip is at right angles to the longest diameter of the opening between the rolls, the candy strip being represented by the dotted lines C in Fig. 18. As a result of this, as the strip of candy is squeezed between the rolls in reducing the size thereof it will be compressed or reduced therein so as to assume an oval form in cross-section as indicated by the dotted lines C'. But the proportion of the candy strip and the size of the opening between the rolls will be such that the strip of candy will not be squeezed or forced out against the extreme side edges or flanges of the respective rolls, so that the danger of forming fins on the material is obviated as is also the danger of banking up and clogging.

It will be noticed that the next succeeding set of reducing rolls 30 and 31 are placed at right angles to the rolls 22 and 23 and these rolls 30 and 31 have their peripheries grooved in the same manner as the preceding rolls so as to provide an oval-shaped or oblong opening between the same whose longest diameter will be at right angles to the longest diameter of the opening between the rolls 22 and 23. The result of this arrangement is that the oval-shaped strip of candy will approach the rolls 30 and 31 with its longest diameter at right angles to the longest diameter of the opening between the said rolls 30 and 31 which will result in a like operation as described in connection with the rolls 22 and 23. The same thing is true of the subsequent sets of reducing rolls 40 and 41, 45 and 46 and 52 and 53 with this exception that the oval-shape of the opening between each set of rolls gradually decreases so that when the strip of candy leaves the rolls 52 and 53 it has assumed almost a round shape. The feed rolls 57 and 58 have their grooves so formed that the opening between the same is substantially round so that as the candy strip passes between the same it will be caused to assume a substantially round form, but inasmuch as these feed rolls are not reducing rolls there will be no danger from the difficulties before mentioned.

*Twisting, severing and discharging devices.*

These devices are located at the rear end of the machine, being supported upon a bracket 64, secured to the main support 1. Revolubly mounted in a removable bushing 65 in the lower part of this bracket 64 is a hollow shaft or tube 66 which receives rotary movement from the shaft 26 through the medium of the gear 67 on said shaft, gear 68 fast to a block 69 and pinion 70 secured to the tube 66. The rear end of this tube 66 is formed with a forked head 71 and in the forks of this head are journaled the shafts 72 and 73 of feeding twisting rolls 74 and 75, provided with grooved peripheries so formed that the opening between the same will be circular in shape and of a size substantially equal to the opening between the feed rolls 57 and 58 and also slightly less than the opening through the tube 66. The feed rolls 74 and 75 are revolved in opposite directions and are also revolved at the same speed as the preceding feed rolls 57 and 58 in the following manner: The shafts 72 and 73 have connected therewith worm wheels 76 and 77 (see Fig. 7) with which mesh a worm 78 on a longitudinally extending shaft 79, the forward end of which shaft has a pinion 80 which is in mesh with a gear 81 fixed to the bushing 65. The result of this is that as the shaft or tube 66 is revolved, the rolls 74 and 75 will also be revolved about the axis of the shaft 66 and also on their own axes by reason of the gearing described, thus not only imparting a feeding movement to the strip of candy but also a twisting action thereto so as to cause the colored strips C$^2$, which have been placed in the batch of candy, to assume a spiral form as shown in Fig. 19; the tube 66 acting as a guide and support for the strip of candy during this operation.

When the candy strip thus twisted leaves the rolls 74 and 75 it passes through an opening 82 on a downwardly extending arm 83 which is connected at its upper end to a slide 84 and has at its lower end a rearwardly extending support 85 located in line with the opening 82 which receives the candy strip. The severing is accomplished by a rotatable disk 86, the shaft 87 of which is eccentrically mounted in the block 69 previously referred to as being connected with the gear 68. Located in the main bracket 64 is a fixed internal gear 88 and meshing with this gear 88 is a long pinion 89 on the shaft 87 so that as the block 69 is rotated the pinion 89 will be carried about the fixed gear 88 and rotary movement thus imparted to the shaft 87 as well as an eccentric movement by reason of its eccentric location in the rotary block 69. Means are provided for causing the severing disk 86 and the support 85 to travel with the candy strip so that when the severing operation takes place the knife will be maintained at the severing point in the strip until the severing operation is completed and the knife withdrawn out of the material. The slide 84 previously referred to is slidably mounted in a groove or guideway on the upper side of the bracket 64 and carries downwardly-extending cam rolls 90 and 91 located on opposite sides of the gear 68, which gear has cam faces 92 and 93 on opposite sides thereof with which these rolls 90 and 91 coöperate so that as the gear 68 rotates a reciprocating movement will be imparted to the slide; the arrangement being such that the slide will be caused to reciprocate at the same speed that the candy strip is traveling. The forward end of the slide 84 has a downwardly-extending arm 94, to the rear side of which is secured a circular housing 95 having an opening 96 through which the shaft 87 extends; this opening being of sufficient size to permit of the eccentric movement of the shaft. Located in this housing and connected with the shaft is a disk 97 which has a snug fit between the arm 94 and the wall of the housing, which serves to cause the shaft 87 and its severing disk 86 to travel in a longitudinal direction with the slide 84 but at the same time permits the revolving and eccentric movement of the shaft. It should be stated that it is necessary in the construction to extend the shaft 87 through the arm 83 and the arm 83 is therefore provided with an opening 98 of sufficient size to permit of the eccentric movement of the shaft 87.

The severed piece of candy is discharged from the support 85 into what is called a final former, which will be described hereinafter, by the following devices: The main bracket 64 has connected on its upper side and extending rearwardly therefrom an auxiliary bracket 99 within which is journaled a rock shaft 100, the rocking movement being imparted to the shaft by a cam 101 and an arm 102 connected with the shaft 100, the free end of the arm preferably having a roller 102ª thereon and a spring 102ᵇ being also preferably employed for maintaining the roller in proper contact with the surface of the cam (Fig. 11). Rotary movement is imparted to the cam by the shaft 103 to which is connected a gear 104 which is driven by the gear 68. The rear end of the shaft 100 has a downwardly extending arm 105 to the lower end of which is connected a pair of open-bottom housings 106 and 107, which lie in a plane just above the support 85. The contour of the cam 102 is such as to alternately bring each of these housings in line with the candy strip and to maintain it there until the severing operation has been completed and to then eject the severed pieces of candy from the support 85 into the final former previously referred to.

It should be explained that the severed piece of candy is moved out of line with the main candy rod before the severing disk is completely withdrawn from its severing position, as shown in Fig. 7ª; the purpose of this being to prevent the end of the severed stick from adhering to the main portion of the candy at the point where they were severed, which would sometimes take place if the severing blade was withdrawn ahead of the discharging action.

In order to keep the sides of the severing disk 86 from becoming fouled by adhering pieces of candy, there is provided a pair of lubricating pads 108 and 109 on the lower ends of arms 110 and 111 secured to the rock shaft 100, so located that when the severing disk is in its extreme forward position one side thereof will be in contact with the one pad 108 and when the severing disk is in its extreme rearward position it will be in contact with the other pad 109; the rocking movement of the pads imparted thereto by the shaft 100 causing them to come in contact with a larger surface of the disk than if the pad were stationary.

In Figs. 20 and 21 is shown an attachment for the discharging devices for the purpose of preventing the severing disk from bending the end of the severed piece of candy, as might sometime happen when the face of the disk becomes sticky from an accumulation of candy thereon. It might be explained here that it is necessary to sever the candy stick at some distance from the forward ends of the housings 106 and 107 so as to allow for the rearward travel of the knife, it being remembered that the knife travels rearward with the candy and must continue its travel for some distance after the candy has been actually severed in order to allow for the withdrawal of the disk from the candy. This results in the forward end of the severed piece of candy necessarily being at a point removed from the forward ends of the housings 106 and 107 at the time it is severed and as the candy is still in a plastic state it is easily bent. In this case the lower end of the arm 105 is provided with an enlarged portion 112, on the lower side of which is formed the housings 106 and 107 previously described. This enlarged portion is formed with a chamber 113 within which is slidably mounted a stem 114 having a reduced portion or rod 115 which extends through the chamber and is slidably mounted in the rear end of the portion 112 and is provided with a stop in the nature of a nut 116. A coiled spring 117 is interposed between the rear end of the stem 114 and the rear wall of the chamber. The forward end of the stem 114 has a downwardly extending arm 118, the lower end of which is provided with chambered portions or housings 119 and 120 corresponding to the housings 106 and 107. The arm 118 is also provided with a stem 121 which is slidably mounted in a bore 122 in the enlarged portion 112 to form an additional guide. Journaled in the forward end of the stem 114 is a friction roll 123. The result of this construction is that as the severing disk 86 moves rearwardly it will contact the roll 123 and force the housings 119 and 120 rearwardly against the tension of the spring 117 so that the housing, 119 or 120, as the case may be, will surround the forward end of the severed piece of candy and form a guide therefor so as to prevent the severing disk from bending the forward end of the severed piece of candy from the cause before mentioned. So soon as the severing operation has taken place and the severing disk withdrawn from the material and moves forwardly again, the spring 117 will force the housings 119 and 120 forwardly until arrested by the stop 116.

*Final former.*

The purpose of the final former is to impart to the severed sticks of candy uniformity as to roundness and length and also that attractive appearance which is usually possessed by hand-made stick candy. A further purpose of this final former is to impart to the ends of the candy sticks a slightly rounded form so as to avoid any sharp edges or corners which would have a tendency to tear the wrappers which are sometimes placed upon these sticks by candy wrapping machines; it being understood in this connection that it is usual to twist the ends of the wrappers and that any sharp projecting edges or corners would therefore have a tendency to break through the wrappers. This final former consists essentially of a series of movable pockets into which the sticks are deposited from the discharging devices before described, which pockets carry the sticks beneath a revolving band which imparts a rotary movement to the sticks within the pockets which causes the sticks to assume a uniform shape. Referring more particularly to Figs. 2, 3, 4, 5, 11 and 12, 124 represents a longitudinally extending shaft, one end of which is journaled in one of the end legs 2 and the opposite or rear end of which is journaled in a bearing 125 secured to one of the other end legs 2; the shaft being driven from the shaft 12 through the medium of the spur gears 147 and 148. Keyed to the shaft 124 is a circular flange or wheel 126 and loosely mounted upon the bearing 125 is a second circular flange or wheel 127. Fast to the bearing 125 between these two wheels is a circular drum or rim 128, the side edges of which have outwardly-extending flanges 129 and 130, the inner sides of which are slightly flared outwardly so as to form in effect a flaring channeled rim. Connecting the two wheels 126 and 127 is a series of equally spaced plates 131 which form division walls about the channel-shaped rim 128 so as to provide in effect moving pockets. The preferable manner of securing these plates in position is by milling slots 132 transversely across the rims of the wheels and driving the plates 131 therein. The plates are so shaped that they will conform to the interior of the channel-shaped rim 128 but preferably project beyond the outer periphery of the flanges thereof.

Extending partly about the movable pockets thus formed is a belt 133; this belt passing about the pulleys 134, 135 and 136, the pulleys 134 and 135 being idle ones and so disposed that one portion of the belt will snugly hug the outer edges of the partitions 131 from a point in close proximity to the discharging devices to a suitable point of discharge. This belt is revolved from the shaft 124 through the medium of the beveled gear 137 on said shaft, beveled gears 138 and 139 supported in a bracket 140, beveled gear 141 also supported in said bracket 140, spur gear 142, intermediate gear 143 and gear 144 connected with the pulley 136. The arrangement and ratio of the gearing is such that the belt will move in the same direction as the partitions 131 which will be in the direction of the arrow in Fig. 4, but at a greater speed, the belt moving substantially twice as fast as the pockets. The result of this construction is that the severed pieces of candy, after they are discharged into the pockets, which revolve just beneath the discharging devices, will be carried by the pockets beneath the belt and given a rotary movement thereby within the pockets which imparts to the sticks a uniform roundness, and, also, the fillets formed between the flanges 129 and 130 and the rim 128 will have the effect of rounding the ends of the sticks and removing any sharp corners therefrom. It should be explained that the height of the parts forming the pockets is such that when the severed sticks are discharged into the pockets, the sticks will extend beyond the partitions as shown in dotted lines in Fig. 12 and the sticks will also be somewhat shorter than the pockets to allow the sticks to lengthen out as they are reduced in diameter by the pressure of the belt.

The nature of the candy from which the sticks are formed is such that after the sticks are severed there is a tendency for the candy in the sticks to shrink which they will do unless provision is made for preventing it until the sticks have become chilled to a certain extent. By depositing the severed sticks into the final former and holding them under pressure while being rolled for a suitable length of time, this shrinkage is prevented and the sticks held to a uniform length after being severed.

In order to insure the severed sticks of candy being properly deposited in the pockets, the flange 129 is discontinued beneath the discharging devices to a suitable point in the direction of travel of the plates, the length of the discontinuation being preferably equal to the width of substantially about seven pockets as shown in Fig. 3. The bar 83 previously referred to as carrying the support 85 has connected therewith an arm 145 which extends in the direction of travel of the pockets and has at its free end a projection 146 formed preferably of felt or some similar soft substance. As the arm 83 moves rearwardly in the manner heretofore described this pad 145 will enter the pockets, as shown best in Fig. 3 and push the sticks to their proper position within the pockets, which would be a position within the flanges 129 and 130.

The ratio of gearing which drives the revolving pockets, in its relation to the discharging devices, is such that an open pocket will be in proper position at either side of the support 85 to receive the stick of candy as it is discharged therefrom. The severed sticks discharged on one side of the support will drop into alternate pockets on that side thereof, while the sticks discharged on the opposite side of the support will likewise drop into alternate pockets; in other words, the final former will move a distance of two pockets to each reversal of the arm 105.

When the pockets with their candy sticks leave the belt 133 at the point where it passes about the pulley 136, the sticks will be held within the pockets by a curved shield 149 (see Figs. 4 and 5), the upper end of which has an inclined extension 150. The lower end of the shield 149 is bolted to the bracket 151 (shown in dotted lines in Fig. 4 and also in Fig. 2) and the lower end of the shield extends in close proximity to the belt so that there will be no tendency of the sticks to follow the direction of travel of the belt. The inclined extension 150 is beneath the center of rotation of the final former, so that when the sticks come in line with the inclined extension they will roll out of the pockets and down the extension into the cooler, which will now be described.

*Cooler.*

The cooler consists of a plurality of series of movable pockets, the respective series being represented by *a, b, c, d, e, f, g* and *h*, (see Figs. 8, 9 and 10), the respective series being arranged circular in form and concentrically disposed with respect to the axis of rotation thereof. Each series of pockets consists of transversely extending divisional walls 152, one end of each of which is connected to a circular disk 153, which is connected by arms or spokes 154 to a hub 155, which is fast to a shaft 156, journaled in the bracket 151 and receiving motion from the shaft 124 through the medium of spur gears 157, 158, 159 and 160. Arranged between each series of divisional walls is a drum, these drums being represented by 161, 162, 163, 164, 165, 166, 167 and 167', the drums providing stationary bottoms for the pockets formed by the partitions 152. These drums are secured to a circular flange 168, which is fastened by arms 169 to a hub 170 which is clamped to the bracket 171 and which also forms a bearing for the shaft 156. When the respective sticks of candy reach the bottom of the incline 150 they will roll one by one into the outer series of pockets formed by the drum 161 and the partitions 152, which partitions are revolving in the direction of the arrow shown in Fig. 5, and will be carried by the partitions until they coincide with an opening 172 (see Figs. 8 and 22), whereupon they will drop down into the next series of pockets *b;* one edge of the drum along the opening 172 being inclined as indicated at 172ª (Fig. 22) so that one end of the candy stick will drop ahead of the other to prevent breaking. The sticks of candy will then be carried about the cooler by the series of pockets, *b*, until they coincide with an opening 173 in the drum 162, which is formed similar to the one 172, whereupon they will drop into the next series of pockets *c*, and so on until they are finally deposited into the series of pockets, *h*, from which they will be discharged through an opening 175 (see Figs. 4 and 8) into a receptacle 176. This opening 175 is controlled by a valve 177 so that after a predetermined interval of time the valve 177 will close and will form in effect a continuation of the drum 167' so that the sticks will be carried to an opening 178 and be deposited into a second receptacle 179. The valve 177 is operated from a cam 180 secured to the shaft 156, the valve being provided with a valve stem 181, the lower end having a friction roller 182 which rides about the cam; the valve being closed against the tension of a spring 183 which is coiled about the stem 181 and is interposed between a collar 184 thereon and a fixed part 185 secured to the receptacles. It might be explained that the high part of the cam extends half way about the periphery thereof so that the valve will be closed and opened once each revolution of the cam. The lower series of pockets in the present machine are ninety-six in number so that in the event all the pockets were filled, forty-eight sticks would be deposited in the receptacle 176 and forty-eight in the receptacle 179 during one complete revolution of the cooler.

Provision is made for causing a circulation of air throughout all the series of pockets excepting the outer one, *a*, and to this end each of the drums, excepting the outer and inner ones, 161 and 167', is provided with a series of perforations 186. It will also be seen that the partitions 152 are of such width that an open space will be formed above and beneath the same and it will also be noticed that these partitions terminate at a point removed from the flange 168 so that a free circulation of air will be permitted between the respective pockets of each series. Air under pressure is supplied to the pockets from a blower 187 (see Figs. 1 and 4) which is driven from shaft 12 through the medium of the pulley 188, belt 189 and a second pulley 190 on the shaft of the blower; the air being conducted from the blower to an inlet opening 191 in the lower side of the disk 168 through the medium of the pipe 192.

Having thus described my invention, I claim:—

1. In a machine for making stick candy, reducing and feeding devices for forming said candy into a rod, a mechanical severing device forming a part of said machine for severing said rod into sticks, a second forming device, and mechanical means forming a part of said machine for discharging said several sticks from said severing device into said second forming device, said second forming device comprising mechanism for confining and rolling the sticks between two surfaces under compression until partly chilled to maintain the uniformity of said sticks.

2. In a machine for making stick candy, reducing and feeding devices for forming said candy into a rod, a device for twisting the reduced rod of candy, and a mechanical severing device for severing said twisted rod into sticks, a second forming device, and means for discharging said severed sticks into said second forming device, said second forming device comprising mechanism for rolling the sticks between two surfaces, one of which is movable relatively to the other, together with division walls for said sticks movable at a less speed than said moving surface.

3. In a machine for making stick candy, reducing and feeding devices for forming said candy into a rod, a severing device for severing said rod into sticks, and a second forming device to receive said sticks from said severing device, said second forming device comprising a series of movable pockets for said sticks together with means for rotating the sticks therein.

4. In a machine for making stick candy, mechanism for forming said candy into sticks, and a second forming device, said forming device having a series of movable pockets to receive the sticks from said mechanism, said pockets consisting of a stationary bottom, and movable sides, said second forming device also having means for rotating said sticks within said pockets.

5. In a machine for making stick candy, mechanism for forming said candy into sticks, and a forming device, said forming device having a series of pockets to receive the sticks from said mechanism, said pockets consisting of a stationary bottom and ends and movable sides, said forming device being also provided with means for rotating said sticks within said pockets.

6. In a machine for making stick candy, mechanism for forming said candy into sticks, and a forming device, said forming device consisting of a circular rim having outwardly flaring flanges, a series of movable partitions between said flanges, which form in effect movable pockets which receive the sticks from said mechanism, and means for rotating said sticks under pressure within said pockets.

7. In a machine for making stick candy, mechanism for forming said candy into sticks, and a second forming device, said forming device consisting of a series of movable pockets to receive the sticks from said mechanism, and a movable band extending about said pockets for rotating said sticks under pressure therein.

8. In a machine for making stick candy, mechanism for forming said candy into sticks, and a second forming device, said forming device having a series of pockets to receive the sticks from said mechanism, said pockets consisting of a stationary bottom and movable sides rotatable about said stationary bottom, and a movable band lying against the said pockets for rotating said sticks under pressure therein.

9. In a machine for making stick candy, feeding and reducing devices to form said candy into a rod arranged to impart a continuous feeding movement thereto, a cutting disk and its shaft, a rotatable block in which said shaft is eccentrically journaled and longitudinally movable, means for rotating said shaft therein, and means for moving said shaft longitudinally therein to cause it to travel with the candy rod during the severing operation.

10. In a machine for making stick candy, feeding and reducing devices to form said candy into a rod arranged to impart a continuous feeding movement thereto, a cutting disk and its shaft, a rotatable block in which said shaft is journaled and longitudinally movable, means for rotating said shaft therein, a sliding member together with means for imparting reciprocating movement thereto, and a connection between said shaft and said sliding member whereby the cutting disk will be caused to travel with the candy rod during the severing operation.

11. In a machine for making stick candy, feeding and reducing devices to form said candy into a rod arranged to impart a continuous feeding movement thereto, a cutting disk and its shaft, a support, a block rotatably mounted in said support, said shaft eccentrically journaled in said block and longitudinally movable therein, a sliding member carried by said support, a housing secured to said sliding member having an enlarged opening through which said shaft extends, a disk on said shaft in said housing, means for imparting rotary movement to said shaft, and means for imparting reciprocating movement to said sliding member whereby the cutting disk will be caused to travel with the candy rod in the severing operation.

12. In a machine for making stick candy, mechanism for forming said candy into sticks including a severing device, and a movable discharging device in proximity to said severing device having a plurality of compartments arranged to be brought alternately in line with and to receive the end of the candy rod before the severing operation, and a support beneath said movable device for the severed pieces of candy.

13. In a machine for making stick candy, mechanism for forming said candy into sticks including a severing device, and a movable device having a plurality of compartments arranged to be brought alternately in line with and to receive the end of the candy rod before the severing operation, a support beneath said movable device, and a pocketed member movable beneath said support to receive the sticks when discharged therefrom by said movable device.

14. In a machine for making stick candy, mechanism for forming said candy into sticks including a severing device and a movable device having a plurality of open bottom compartments arranged to be brought alternately in line with and to receive the end of the candy strip before the severing operation, a support beneath said movable device, and a second forming device having a series of pockets movable beneath said support to receive the severed sticks when discharged therefrom by said discharging device.

15. In a machine for making stick candy, mechanism for forming said candy into sticks including devices for imparting a continuous feeding movement to a candy rod and a severing device, a main guide for the end of the candy rod, means for causing the severing device to travel with the candy rod during the severing operation, and an auxiliary movable guide between the severing device and the main guide.

16. In a machine for making stick candy, reducing and feeding devices for forming said candy into a rod and imparting a continuous feeding movement thereto, a severing device together with means for causing said severing device to travel with the candy rod during the severing operation, a main movable device having a plurality of compartments arranged to be brought alternately in line with and to receive the end of the candy rod before the severing operation, and an auxiliary guide for the candy rod movable with said main device and also movable to and from the same with the severing device.

17. In a machine for making stick candy, reducing and feeding devices for forming said candy into a rod and imparting a continuous feeding movement thereto, a severing device together with means for causing said severing device to travel with the candy rod during the severing operation, a main vibrating device having two compartments arranged to be brought alternately in line with and to receive the end of the candy rod, an auxiliary guide for the candy rod slidably connected with said main vibrating device between the same and the severing device, and a spring for normally holding the same against said severing device but permitting it to yield and move with said severing device.

18. In a machine for making stick candy, mechanism for forming said candy into sticks including devices for imparting a continuous feeding movement to the candy rod and a severing device, a movable discharging device for said sticks having a plurality of pockets together with means for bringing said pockets alternately into line with said candy rod to receive the end thereof, means for causing the severing device to travel with the candy rod during the severing operation, and means for causing the discharging device to move the severed sticks of candy out of line with the candy rod before the severing device has been withdrawn from said candy.

19. In a machine for making stick candy, feeding and reducing devices for forming the candy into a pliant rod, a severing device for severing said rod into sticks, a final forming device into which said sticks are discharged while in pliant condition, and a cooling device to receive the sticks from said final forming device.

20. In a machine for making stick candy, feeding and reducing devices for forming the candy into a rod, a severing device for severing said rod into sticks, a final forming device together with means for discharging said sticks one by one thereto, and a cooling device together with means for feeding the sticks one by one thereto from said final forming device.

21. In a machine for making stick candy, mechanism for forming said candy into sticks, a cooling device to receive the sticks from said forming mechanism, a plurality of compartments at the discharge end of said cooling device, and means for automatically discharging a predetermined number of sticks alternately into said compartments.

22. In a machine for making stick candy, mechanism for forming said candy into sticks, a cooling device to receive the sticks from said forming mechanism together with means for causing the sticks to travel therethrough, a plurality of compartments at the discharge end of said cooling device, said cooling device having an opening leading into each of said compartments, a valve, and means for causing said valve to open and close the opening nearest to the point of approach of said sticks.

23. In a machine for making stick candy, a plurality of pairs of reducing rolls, each roll of each pair being formed with a grooved periphery, the grooves being so formed as to provide an oval-shaped opening between the rolls of each pair, the rolls of one pair being disposed at right angles to the rolls of the adjacent pair.

24. In a machine for making stick candy, a plurality of pairs of reducing rolls, each roll being provided with a grooved periphery so formed as to provide oval shaped openings between each pair of rolls, said pairs of rolls being so disposed with respect to each other that the long diameter of one opening will be at right angles to the long diameter of the other opening, for the purpose specified.

25. In a machine for making stick candy, devices for forming said candy into a rod, a severing device for severing said rod into sticks, mechanism for discharging the severed sticks into a second forming device, said second forming device comprising a pressure member so constructed and arranged as to maintain said sticks under pressure until partly chilled.

26. In a machine for making stick candy, devices for forming said candy into a rod, a severing device for severing said rod into sticks, mechanism for discharging the severed sticks into a second forming device, said second forming device comprising a stationary floor and a movable pressure member so constructed and arranged as to roll and maintain said sticks under pressure until partly chilled.

27. In a machine for making stick candy, devices for forming said candy into a rod, a severing device for severing said rod into sticks, mechanism for discharging the severed sticks into a second forming device, said second forming device comprising a stationary floor, movable pockets for the severed sticks arranged about said stationary floor, and a pressure member movable at a greater speed than said pockets so constructed and arranged as to roll and maintain said sticks under pressure until chilled.

28. A machine for making stick candy, reducing and feeding devices for forming said candy into a rod, means for severing said rod into sticks, a second forming device, and means for discharging said severed sticks to said second forming device, said second forming device comprising means for rolling the sticks between two surfaces and for rounding the ends thereof.

29. The method of making stick candy consisting in feeding and reducing a batch of candy into the form of a rod, mechanically severing the candy rod into sticks of conventional length, then rolling said sticks under compression to partly chill the same, and thereafter cooling the sticks.

30. The method of making stick candy consisting in feeding and reducing a batch of candy into the form of a rod, mechanically severing the candy rod into sticks of conventional length while the same is being fed, then rolling said sticks under compression until partly chilled, and thereafter cooling the sticks by continuous rolling.

31. The method of making stick candy, consisting in feeding and reducing a batch of candy into the form of a rod, mechanically severing the candy rod into sticks of conventional length, then mechanically discharging the severed sticks into a rolling device and rolling said sticks therein under compression until partly chilled, and thereafter cooling the sticks.

32. The method of making stick candy, consisting in feeding and reducing a batch of candy into the form of a rod, mechanically separating the candy rod into sticks of conventional length, then confining the ends of said severed sticks and rolling said sticks under compression to cause the same to assume a uniform shape and partly chill the same, and thereafter cooling the sticks.

33. The method of making stick candy consisting in feeding and reducing a batch of candy into the form of a rod, mechanically severing the candy rod into sticks, rolling said sticks under compression to partly chill the same and also rounding the ends thereof, and thereafter cooling the sticks.

In testimony whereof, I have hereunto set my hand this 15th day of September, 1916.

DENNIS T. IGOU.

Witness:
CHAS. I. WELCH.